UNITED STATES PATENT OFFICE.

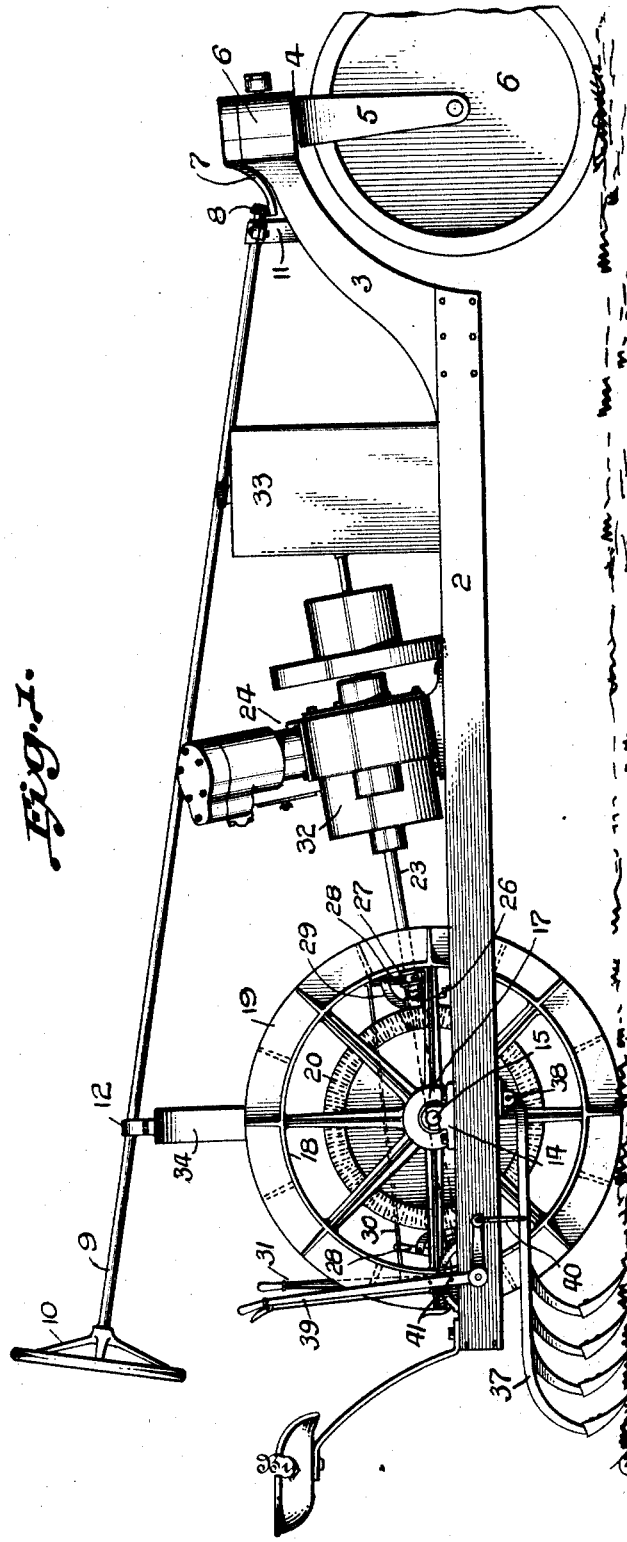

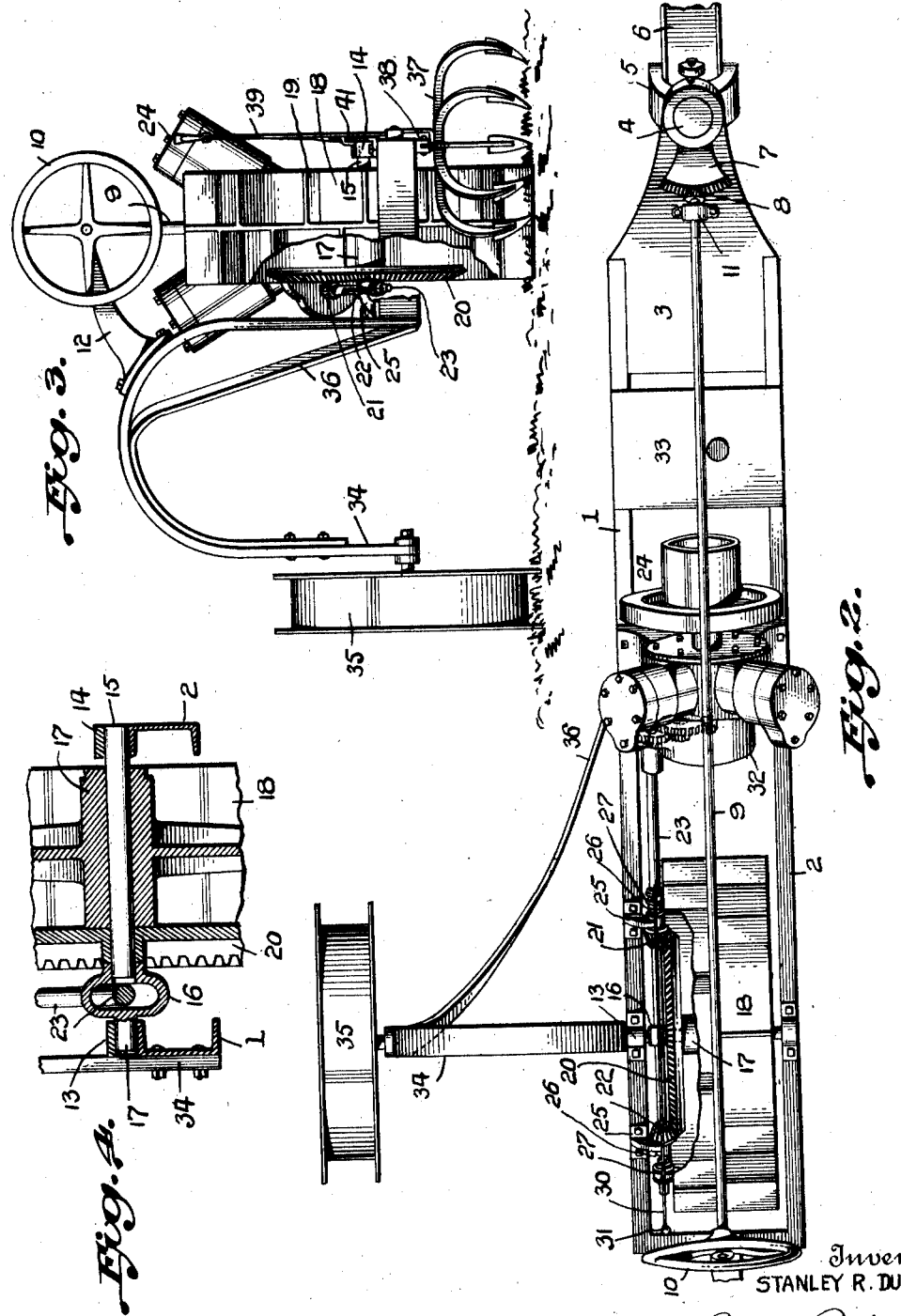

STANLEY R. DU BRIE, OF DETROIT, MICHIGAN, ASSIGNOR TO EDWARD H. KRAMER, OF DETROIT, MICHIGAN.

TRACTOR.

1,385,249.  Specification of Letters Patent.  Patented July 19, 1921.

Application filed November 4, 1918, Serial No. 261,092. Renewed December 1, 1920. Serial No. 427,658.

*To all whom it may concern:*

Be it known that I, STANLEY R. DU BRIE, a citizen of the United States of America, residing at Detroit, in the county of Wayne and State of Michigan, have invented certain new and useful Improvements in Tractors, of which the following is a specification, reference being had therein to the accompanying drawings.

The primary object of my invention is to provide a tractor that may be advantageously used for agricultural purposes and wherein the power plant is disposed relative to a traction wheel so that maximum power may be delivered as near as possible to the tractive center of the traction wheel, and thus eliminate the torque on driving connections and stresses and strains incident to the transmission of power from an engine to a traction wheel.

Another object of my invention is to provide a two-wheel tractor wherein the power plant alines with the wheels of the tractor and has a power transmission mechanism devoid of complicated parts; easy to control, and not liable to injury by ordinary use.

A further object of my invention is to provide a tractor to which various kinds of farm implements may be attached and adjusted and special provision is made so that implements may be drawn by the tractor relative to small growing plants, the tractor having a third wheel attachment that bridges small plants and permits of an implement being operated to till soil in proximity to said plants.

The above are a few of the objects attained by my novel tractor, which will be hereinafter described and then claimed.

Reference will now be had to the drawings, wherein

Figure 1 is a side elevation of the tractor;

Fig. 2 is a plan of the same;

Fig. 3 is a view of the rear end of the tractor, partly broken away; and

Fig. 4 is an enlarged detail sectional view of a portion of the traction wheel and its bearings.

The tractor comprises an oblong frame or chassis having longitudinal parallel side members 1 and 2 with the forward ends thereof connected by an upwardly and forwardly extending head piece 3 providing a bearing 6 in which is journaled a post 4 on a yoke 5. Rotatable in the yoke 5 is a steering wheel 6 and this wheel with the yoke 5 is somewhat in the form of an adjustable caster and constitutes means for supporting the forward end of the tractor and steering the same in a desired direction. The upper end of the post 4 has a sector gear 7 and meshing therewith is a beveled gear wheel 8 on the forward end of a rearwardly extending steering shaft 9 that has the rear end thereof provided with suitable wheel 10. The forward end of the steering shaft 9 is supported in a suitable bearing 11 carried by the head 3 and the rear end of said steering shaft is journaled in a bracket 12 supported in a manner to be hereinafter referred to.

The side members 1 and 2, adjacent the rear end of the tractor, are provided with transverse alining bearings 13 and 14, best shown in Figs. 2 and 4. Fixed in the bearing 14 is one end of an axle 15 and the opposite end of said axle is fixed in a yoke 16 having a hub 17 mounted in the bearing 13, said yoke being a continuation of the axle 15 and corresponding somewhat to a solid axle provided with an opening adjacent one end thereof.

Rotatable on the axle 15, between the yoke 16 and the bearing 14 is the hub portion 17 of a traction wheel, generally designated 18. This wheel under normal conditions longitudinally alines with the steering wheel 6 and said traction wheel may be made of sufficient width so as to coöperate with the steering wheel, in providing a two-wheel tractor. The traction wheel may be of any well known design, but for agricultural purposes, includes a ribbed tread or spuds 19 and in order that said traction wheel may be driven, one side thereof is provided with a large circular rack or beveled gear wheel 20. Meshing with this rack are opposed beveled gear wheels or pinions 21 and 22 loose on a longitudinal shaft 23 extending through the yoke 16 and forwardly to a power plant 24, said shaft being supported through the medium of the beveled gear wheels 21 and 22, and said power plant suitably connected to the side members 1 and 2 intermediate the ends thereof.

The beveled gear wheels 21 and 22 have hub portions journaled in bearings 25 carried by the member 1, and the hub portions of said beveled gear wheels are provided with clutch teeth 26 adapted to be engaged by clutch members 27 slidably keyed on the longitudinal drive shaft 23. The clutch members 27 are shifted through the medium of levers 28, pivotally supported by brackets 29 from the bearings 25, and said levers are connected by a rod 30 so as to be shifted in synchronism to alternately place the clutch members in driving relation to the beveled gear wheels 21 and 22. The rear end of the rod 30 is connected to an operating lever 31 supported from the side frame 1 and capable of being fixed in an adjusted position. The forward end of the shaft 23 extends into a casing 32 of the power plant 24, said casing containing a conventional form of reduction gear mechanism, so that the power of the power plant 24 may be reduced relative to the traction wheel. The power plant has been shown as a V type engine or motor, and it may be placed at a slight inclination relative to the side members 1 and 2 so that power may be conveniently transmitted rearwardly to the tractor wheel 18. Adjacent the power plant 24 is a combined fuel and water tank 33 and such other appurtenances or accessories as are necessary for the power plant may be conveniently located in proximity thereto.

Suitably connected to the side member 1, at the bearing 13, is an inverted U-shaped frame 34 having its outer or free end supported by a revoluble wheel 35 and this wheel has its axis alining with the axle 15. The wheel 35 and the frame 34 constitute a third wheel attachment for the tractor, and the frame 34 is connected by a brace 36 to the side member 1 and supports the bracket 12 for the steering shaft 9. The third wheel attachment lends stability to the tractor and the frame 34 of said attachment provides clearance for plants that are to be cultivated by implements either attached to the frame 34 or to the main frame of the tractor. As an instance of an implement being attached to the main frame of a tractor, there is shown a cultivator or gang plow 37 which has its forward end pivotally connected to the member 2, as at 38. The implement may have its rear end raised and lowered relative to the ground by an operating lever 39 having a link connection 40 with said implement, said operating lever being provided with a suitable rack and pawl locking mechanism, as indicated at 41.

Since the third wheel attachment is well braced relative to the main frame of the tractor, it is apparent that various kinds of implements may be connected to the attachment and the main frame of the tractor, so as to be pulled along in proper relation to growing plants to till soil in proximity thereto.

In the operation of the tractor, it is possible to obtain power from the power plant for operating various kinds of farm machinery, while the tractor is stationary, and the manner in which the power is transmitted to the traction wheels permits of the tractor operator delivering power to the traction wheel so as to move the tractor forward or rearward, depending on which beveled gear wheel or pinion 21 or 22 is being driven by the shaft 3. The speed at which the tractor is operated depends on the reduction gearing between the power plant and the traction wheel, and as mentioned in the beginning, I reserve the right to use any type of power plant which may be located intermediate the ends of the tractor and in direct alinement with the traction wheels.

It is thought that the utility of the tractor will be apparent without further description, and while in the drawing there is illustrated a preferred embodiment of my invention, it is to be understood that the structural elements are susceptible to such variations and modifications as fall within the scope of the appended claims.

What I claim is:—

1. A tractor comprising a main frame, and upwardly and forwardly extending head piece carried by said frame, a steering wheel having a turning post in the forward end thereof, a sector gear carried by the post of said steering wheel, a traction wheel at the rear end of said frame and alining with said steering wheel, and supporting said frame below the axis of said wheel, a power plant intermediate said wheels and in alinement therewith, a reduction gearing intermediate said traction wheel and said power plant and adapted for transmitting power to said traction wheel, a side yoke carried by said frame, a third wheel entirely outside of said yoke and supporting said yoke, a bracket carried by said yoke, a bearing on said head piece in alinement with said bracket, a steering shaft journaled in said bearing and said bracket, and a beveled gear wheel on said shaft, and meshing with said sector gear adapted for turning the post of said steering wheel.

2. A tractor as characterized in claim 1, wherein said steering shaft is in the central vertical plane of said tractor and extends above the power plant thereof, and, wherein the side yoke is inverted U-shaped and connected by a similarly shaped brace disposed at an angle to said frame and connected to said frame adjacent said power plant.

In testimony whereof I affix my signature in the presence of two witnesses.

STANLEY R. Du BRIE.

Witnesses:
 ANNA M. DORR,
 KARL H. BUTLER.